UNITED STATES PATENT OFFICE.

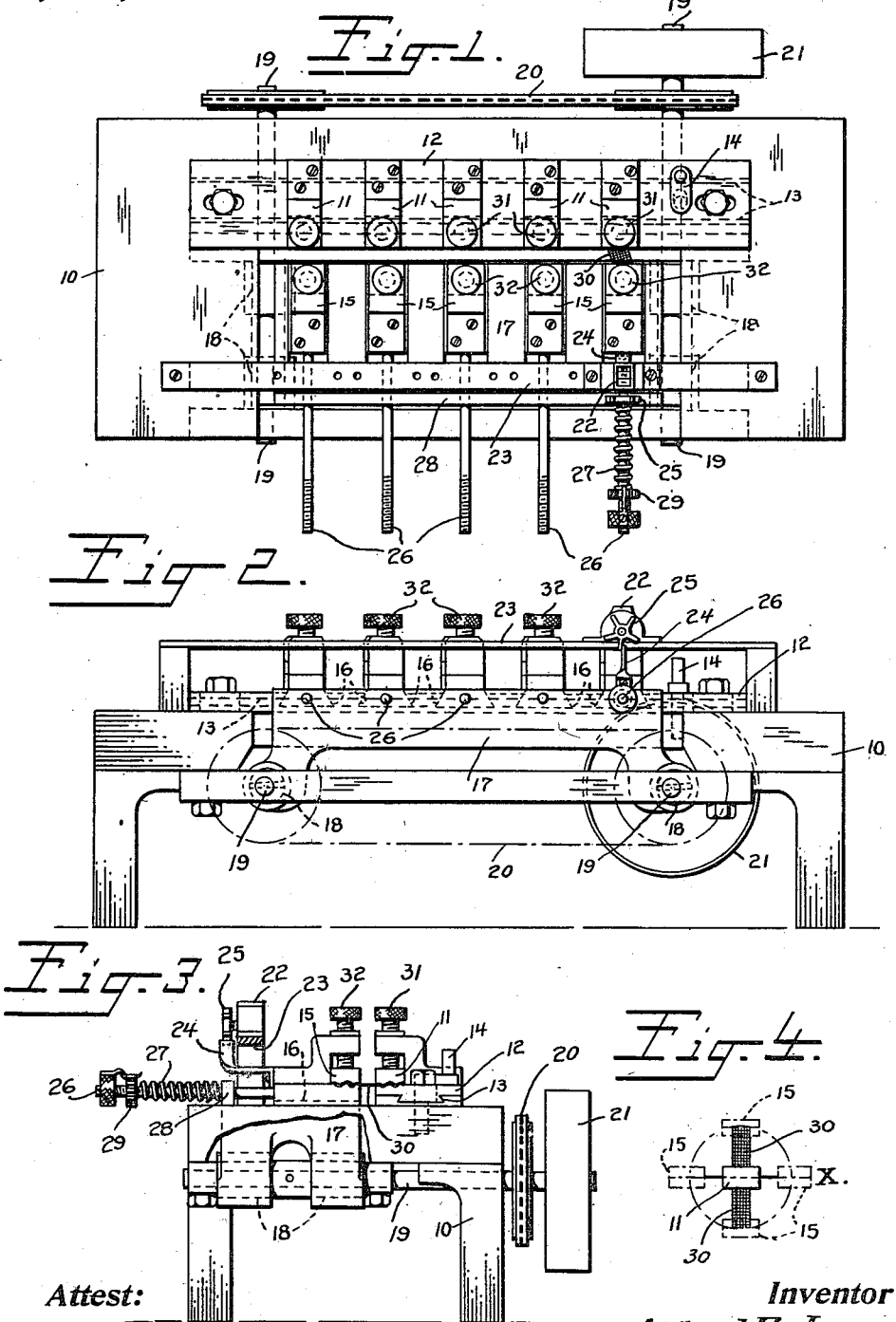

ALFRED E. JURY, OF NEW YORK, N. Y., ASSIGNOR TO RUBBER REGENERATING COMPANY, A CORPORATION OF INDIANA.

TESTING-MACHINE.

1,271,908.     Specification of Letters Patent.     Patented July 9, 1918.

Application filed December 13, 1916. Serial No. 136,598.

*To all whom it may concern:*

Be it known that I, ALFRED E. JURY, a citizen of the United States, residing at New York, county of New York, and State of New York, have invented certain new and useful Improvements in Testing-Machines, of which the following is a full, clear, and exact description.

This invention relates to devices for testing strands, cords, units of fibrous material, fabric, paper, leather and other materials which might during the period of their utility be subjected to a flexing action. It has for an object to provide a device for determining the breaking point of the material due to abrasion. One embodiment of the invention suitable for testing tire fabric will be described.

During flexing of the fabric portion of a tire the threads thereof move back and forth upon each other with resultant friction which causes the threads to chafe, especially at their intersections, and eventually break. By means of the present invention the abrasive resisting qualities of the fabric may be tested under somewhat the same relative movements of the threads as exist in a tire in service, and to attain this end the invention provides means for causing one set of threads to have reciprocatory movement with respect to each other, and the transverse threads have oscillatory movement on the first named threads. The invention further provides means for indicating the amount of such movement the threads will withstand before breaking.

The invention can be easily understood from the following description taken in connection with accompanying drawing in which:

Figure 1 is a plan view of apparatus embodying the invention.

Fig. 2 is a side elevation of the apparatus.

Fig. 3 is an end elevation of the apparatus with parts broken away.

Fig. 4 is a diagrammatic view showing the path of the movable jaw in relation of the fixed jaw.

Referring now to the drawing in which like characters of reference designate similar parts, 10 designates a frame and 11 designates jaws mounted in a row upon a bed plate 12 which may be moved longitudinally in a guide way 13 on the frame by a cam device 14. Jaws 15 are disposed in a row opposite the jaws 11, and are mounted to move toward and away from the latter in respective guide ways 16 in a carrier 17. The carrier is actuated by eccentrics 18 to move the jaws 15 transversely with respect to the jaws 11, in such a manner that each jaw 15 moves in an orbit, as shown diagrammatically in Fig. 4, around the jaw 11 opposite it. The eccentrics are fixed to respective shafts 19 which are connected together by a chain drive 20 and are driven in unison by a belt pulley 21.

A plurality of indicators 22, one for each jaw 15, is mounted on a bar 23 fixed to the frame 10. Secured to each jaw 15 is a finger 24 which advances the star wheel 25 of the related indicator a step at the end of each cycle made by the jaw. Each jaw 15 is provided with a stem 26 upon which is seated a helical spring 27 that bears against an abutment 28 on the frame and against a tension adjusting nut 29 on the stem and serves to push the jaw back in its guide way when the fabric 30 held by the jaws 11—15 breaks and thus carry the finger of the jaw out of register with the star wheel of the related indicator so that further cycles made by the jaw will not be registered.

In operation, the driving pulley 22 is first turned to dispose the movable jaws 15 at their limit of stroke to the right, as shown at X in Fig. 4. The stationary jaws 11 are then moved to the right and brought in axial alinement with the movable jaws, by operating the cam device 14. In this position, the jaws are the shortest possible distance apart. A strip of fabric is then inserted between each pair of jaws and the jaws tightened by advancing their set screws 31—32. The jaws 11 are now moved back to the left to their initial position, thereby slightly tensioning all of the fabric strips to the same degree, and at the same time positioning the jaws at the center of the orbit to be subsequently made by movable jaws 15. The machine is now started, and during each cycle of movement made by the jaws 15, the threads gripped by said jaws will have relative reciprocatory movement and the transverse threads have oscillatory movement on the first named threads. This operation may be continued until the strips break from the internal friction caused by rubbing of the threads upon each other. By thus testing a number of strips from different portions of the fabric at the same time, an average may be calculated from the indicators denoting the approximate number of distortions required to break the threads from abrasive wear.

Although I have described a specific embodiment of the invention, various modifications may be made within the scope of the appended claims without departing from the spirit or sacrificing any of the advantages of the invention.

Having thus described my invention, what I claim and desire to protect by Letters Patent is:

1. In a fabric testing machine, a frame, a series of jaws mounted in the said frame, a carriage in the frame and a series of jaws mounted therein, the two series of jaws being adapted to hold fabric under tension between them, and means for imparting combined endwise and lateral jogging movements to the said carriage.

2. In a fabric testing machine, a frame, a series of jaws mounted in the said frame, a carriage in the frame and a series of jaws mounted therein, means for imparting combined endwise and lateral jogging movements to the said carriage, and means for indicating the number of movements of the carriage so arranged as to become inactive upon the breaking of fabric held by said jaws.

3. In a fabric testing machine, a frame, a jaw mounted in said frame, a carriage and a jaw therein, the two jaws being adapted to hold fabric under tension between them, parallel shafts in the frame, eccentrics on said shafts and in operative relationship with each end of said carriage, a power device and connections between the same and said shaft, whereby the carriage may be given a combined endwise and lateral jogging movement.

4. In a fabric testing machine, a frame and a jaw mounted therein, a carriage and a jaw movable therewith, means for imparting combined endwise and lateral jogging movements to said carriage, and means for indicating the number of movements of the carriage, including a recording device having a drive shaft, an actuating member for said shaft on the carriage, and a spring operative to withdraw the said actuating member out of register with the shaft upon the breaking of a fabric held between said jaws.

Signed at New York, N. Y., this 11th day of December 1916.

ALFRED E. JURY.